United States Patent [19]
Specht et al.

[11] Patent Number: 5,985,362
[45] Date of Patent: Nov. 16, 1999

[54] INSULATION SYSTEM FOR TRANSPORT AIRCRAFT

[75] Inventors: Philip R. Specht, Lakewood; Tom Dunford, Garden Grove, both of Calif.

[73] Assignee: McDonnell Douglas Corporation, St. Louis, Mo.

[21] Appl. No.: 08/995,852

[22] Filed: Dec. 22, 1997

[51] Int. Cl.[6] .............................. B05D 7/22; B05D 1/02; B29C 67/00

[52] U.S. Cl. ...................... 427/236; 427/244; 427/421; 427/407.1; 427/239; 264/46.4

[58] Field of Search .................... 427/244, 421, 427/407.1, 236, 239; 264/46.4

[56] References Cited

U.S. PATENT DOCUMENTS

| | | | |
|---|---|---|---|
| 3,986,781 | 10/1976 | Condo et al. | 404/31 |
| 4,123,575 | 10/1978 | Wesch et al. | 427/386 |
| 4,235,398 | 11/1980 | Johnson | 244/119 |
| 5,251,849 | 10/1993 | Torres | 244/117 |
| 5,472,760 | 12/1995 | Norvell | 428/71 |
| 5,611,504 | 3/1997 | Haynes et al. | 244/119 |

*Primary Examiner*—Shrive Beck
*Assistant Examiner*—Jennifer Calcogni
*Attorney, Agent, or Firm*—Westerlund & Powell; Robert A. Westerlund; Raymond H.J. Powell, Jr.

[57] ABSTRACT

An insulation system for the fuselage walls of an aircraft. The insulation is a formed-in-place, sprayed-on foam that is applied against a barrier material that is draped against the inside of the exterior skin of the fuselage and over any inwardly projecting structural members attached to the exterior skin. No substantial portion of the barrier material passes underneath any laterally projecting portions of the structural members, so that the subsequently solidified, semi-flexible foam (i.e. insulation) can be removed at a later time for necessary inspections of the aircraft, without being trapped behind these lateral projections. The foam is preferably fire retardant and hydrophobic. An additional protective layer may also be sprayed on to the outside surface of the insulating foam.

17 Claims, 1 Drawing Sheet

INSULATION SYSTEM FOR TRANSPORT AIRCRAFT

BACKGROUND OF THE INVENTION

This invention relates to insulation as applied to the inside of the exterior walls of transport aircraft. More particularly, this invention relates to a system for applying spray-on foam mixtures to the interior side of the external skin of the aircraft whereagainst the foam solidifies in place. Still more particularly, the invention includes draping a flexible barrier material between the sprayed-on foam and the external skin and structural and other members that protrude inwardly therefrom prior to application of the foam, which foam then completely covers all surfaces of such skin and members. Even more particularly, the invention relates to forming a semi-permeable layer on the outside of the foam to exclude liquid water therefrom.

Modern aircraft experience large temperature differentials between the inside and the outside of the fuselage that require the employment of insulation to moderate the interior temperature of the aircraft. A difficult challenge is created by exterior temperatures that are below those desired within the fuselage. A commercial airliner at cruising altitude experiences exterior temperatures significantly below freezing, often as low as −40° C. The passengers and crew of the aircraft produce significant levels of humidity within the fuselage. This water vapor tends to condense on cold surfaces presented either on the interior cabin wall, within the insulation in the space between the interior cabin wall and the exterior skin of the aircraft, or on the inside of the exterior skin.

Condensation on the interior cabin wall is undesirable from a passenger comfort aspect. Condensation within the insulation is undesirable because it decreases the efficiency of the insulation and because the added weight from the condensed water increases the cost of operation of the aircraft and decreases its payload capacity. Condensation on the inside of the exterior skin can result in corrosion of the skin and the various structural members attached thereto resulting in decreased lifetime for the various components and the need to check for and repair or replace the corroded components. Corrosion on the inside of the exterior skin produced by condensation of this type and by other causes requires that these areas be able to be inspected at regular intervals. These inspections in turn require that the insulation system be readily removable in order that the inside of the exterior skin as well as the various attached structural members can be viewed and, as necessary, replaced or repaired.

The condensation problem could be largely eliminated if an optimized insulation system could be used. The most common insulation system in use today includes fiberglass bats or blankets that are enclosed by water-impermeable membranes, typically mylar, which are in turn perforated with small holes to prevent ballooning problems within the walls with the inevitable changes in pressure that occur as the airplane ascends and descends from altitude. These fiberglass blankets must be custom made for each aircraft type and, for each type, many individually different patterns must be used in order to effectively fill the open spaces between the interior cabin wall and the exterior skin while avoiding interference with the various structural and other assemblies also inside this space. Hence, these thermal blankets are expensive and difficult to install and maintain.

The thermal blankets work well when initially installed. However, the necessary perforations in the exterior membrane allow water vapor to enter into the blankets. It is estimated that this water vapor can increase the weight of the thermal blanket three fold within a three year period of typical airline service. For example, the thermal blankets in a twin jet aircraft, such as those in the MD-80 series, have been documented to retain, on average, between 330 and 1500 pounds of water. The DC-10/MD-11 trijet aircraft have been documented to retain, on average, between 660 and 2400 pounds of water. Because the wet insulation has a higher thermal conductivity than dry insulation, the heat transfer rate increases, thereby reducing the insulating effect of the blanket. It has been estimated that this added water weight increases the amount of fuel necessary to operate a twin jet aircraft by about $14,000 per year and that this absorbed water accounts for about 5% of the overall corrosion repair costs for the airplane.

The industry has searched for alternative insulation systems to overcome the above-described drawbacks and shortcomings of the conventional thermal insulation blankets. Many have turned to various types of foam systems. One such solution is proposed in U.S. Pat. No. 4,235,398 to William R. Johnson for "Thermal Insulation for Aircraft Fuselage." This system employs a variety of preformed rigid foam panels to provide the necessary thermal and noise insulation for an airliner. The foam used therein is a self-skimming type that minimizes the intrusion of water into the foam. The pre-formed panels have molded-in stand offs such that the foam panels only contact the exterior skin in the small areas of the stand offs, thereby allowing any water that condenses on the inside of the exterior skin to drain off to a central collection point. Although an improvement in certain respects over the fiberglass thermal blankets, this system still requires a large number of different shapes and sizes of preformed foam panels. Since each requires its own separate mold, the cost of this system is quite high.

Another solution is proposed in U.S. Pat. No. 5,611,504 to Haynes et al. for a "Semi-Rigid, Light Weight Fiber Glass/Polyimide Foam Sandwich Blanket Insulation." This blanket insulation system constitutes an evolutionary advancement over conventional fiberglass blankets, and includes fiberglass layers which are alternated with semi rigid layers of polyimide foam. The polyimide foam adds structural rigidity to the fiber glass bats, enhances the sound absorption, and allows for easier installation. However, it does not significantly mitigate the water absorption problem, and it is similar to the conventional thermal blankets with respect to method and cost of fabrication.

Also of interest is U.S. Pat. No. 5,251,849 to Milton J. Torres for "Strain Reduced Airplane Skin." Although not directed toward providing insulation for an aircraft fuselage, this reference teaches the use of a formed in place polyisocyanuarte solid closed cell foam material to increase the strength of the airplane structure. Because of their low density, lack of flammability, relative imperviousness to water, and strength, other foams such as polyurethane or silicone can be used. Since the foam produces a rigid, structural component, it cannot be removed once it is formed in place. However, this reference does not even mention, much less address the absolute requirement of being able to visibly inspect the inside surface of the exterior skin and the various attached structural elements, such as frames and stringers. Employment of a structural foam in the manner taught in this reference precludes the possibility of making these mandatory, visible corrosion inspections. In contrast, a primary advantage of the system of the present invention is that the foam used is somewhat flexible and can be easily removed for inspections.

Based on the above and foregoing, it can be appreciated that there presently exists a need in the art for a system and method capable of providing an effective and low cost insulation system for an aircraft fuselage, which overcomes the above-described drawbacks and shortcomings of the presently available technology. The present invention fulfills these needs in the art.

SUMMARY OF THE INVENTION

The present invention encompasses a system and method for providing an effective, lightweight, hydrophobic, non-rigid, removable foam insulation system at a fraction of the labor costs associated with presently available insulation systems. The substantially entire inner surface of the exterior skin of the aircraft fuselage is first covered by a barrier material. The barrier material is preferably draped over any stringer or other structures attached to the inner surface such that subsequently deposited foam material does not directly contact the metallic inner surface or enter into openings in the stringer, which would otherwise prevent the solidified foam insulation from being removed as required for visual inspections, repairs or other work. Once the inner surface and the stringers are properly draped with the barrier material, the foam material is sprayed onto the barrier material to form the insulation layer, covering substantially the entire metallic inner surface of the fuselage as well as covering stringers and other structures extending inwardly from the inner surface of the exterior surface. As an additional aspect of the invention, a semi-permeable layer may be utilized to form an outer surface of the foam material to prevent liquid water from entering into the foam. This arrangement prevents liquid water from reaching substantially any metallic inner surfaces, and yet the foam insulation system can be readily removed for visual inspection of the metallic inner surfaces merely by removing the barrier material and attached foam.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE PREFERRED EMBODIMENT

The present invention provides for a method of forming the foamed-in-place insulation and the resulting foam insulation system.

Figure 1:
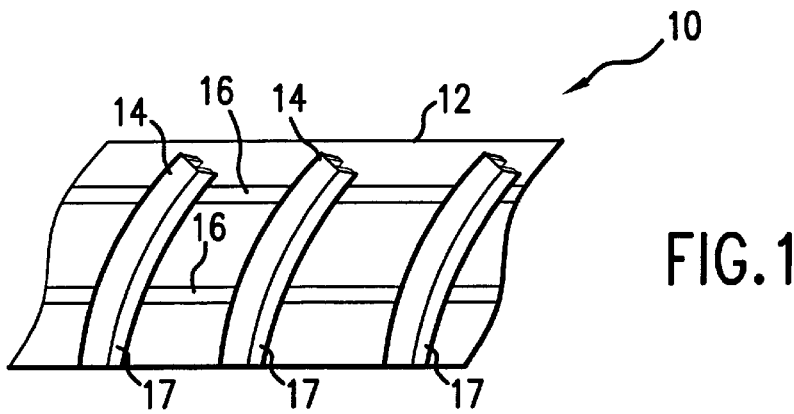
FIG. 1 is an isometric view of a portion of the fuselage structure of an airplane without insulation.

Referring to FIG. 1, a portion of the basic structure of a fuselage is shown in isometric view at 10. This basic structure includes the exterior skin 12, the frame members 14 and the stringers 16. The interior cabin wall, not shown, is attached to the inward facing surfaces 17 of the frame members 14. Not shown but often present are various other components that run through the frame members 14 such as communication lines, electrical power lines and the like.

Figure 2:
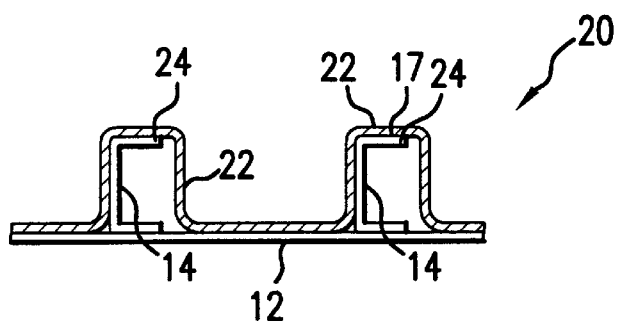
FIG. 2 is a cross sectional view of a portion of the fuselage structure showing the barrier material correctly draped over the structural elements protruding inwardly from the exterior skin.

Referring to FIG. 2, a cross-sectional view of a portion of the fuselage structure is shown at 20. This view shows a portion of the exterior skin 12 and two frame members 14 as well as the barrier material 22 that has been draped across the frame members 14. The barrier material 22 has been carefully positioned so as not to allow any significant amount of the subsequently deposited foam layer to move inwardly of the outside edges 24 of the inwardly facing surfaces 17 of the frame members 14 to the extent that the movement of the foam into these regions would prevent subsequent removal of the foam layer from the region 25 between the two frame members 14. The barrier material is of a type that will adhere readily to the subsequently applied foam material. Because of the excellent adhesion of the foam to the barrier material 22, the insulation system retains its integrity during the remove/reinstall process without delaminating. A preferred material for the barrier material 22 is Mylar® with a thickness of about 2 mils. Other thin, flexible materials with excellent adhesion to the foam could also be used.

The position of the fuselage structure 20 in FIG. 2 is such that no additional steps are necessary to secure the barrier material 22 in the corrected draped position. However, if the fuselage structure 20 rotated 90 degrees right or left to a vertical orientation or 180 degrees to an upside down orientation, steps should be taken to ensure that barrier material 22 is disposed against the exterior skin 12 and the inwardly projecting surfaces 17 of the frame members 14. This can be accomplished by adhesives or clips as are known in the art. Electrostatic forces or a suitably applied vacuum could also be used to cause the barrier material to adhere to the inside of the exterior skin.

Figure 3:
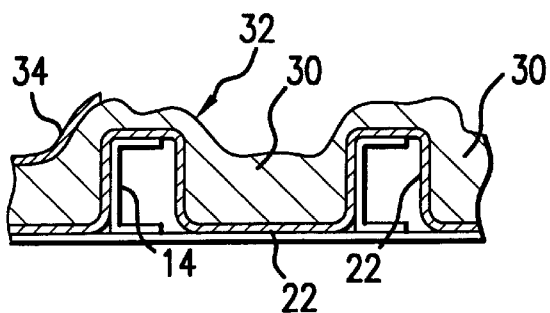
FIG. 3 is a cross sectional view of the portion of the fuselage structure shown in FIG. 2 after the deposition of the foam material onto the barrier material and after the formation of a portion the optional additional protective layer.

Referring to FIG. 3, a cross sectional view of the portion of the fuselage structure shown in FIG. 2 is shown after the deposition of the foam 30 onto the barrier material 22. As can be seen, the spray gun application, discussed in more detail below, results typically in a somewhat uneven thickness for the foam layer 30. The minimum thickness should be that which is sufficient to provide the necessary insulating qualities. Since various types of foams may be employed for this purpose, the precise thickness will depend upon the particular foam used and the thermal demands of the particular aircraft. The foam material is normally applied up onto the inwardly facing surfaces 17 because the foam in these regions will serve to completely insulate the cold frame members 14 from the interior cabin wall panels. This complete foam coverage also acts to form a continuous vapor barrier which will beneficially act to exclude water vapor from the inside of the fuselage wall if a foam that is closed-cell and forms a water-resistant external skin 32 upon curing is chosen. In this manner condensation on the cabin wall panels in the immediate vicinity of the attachment zones to the frame members 14 may be avoided.

If the need for a metal-to-metal contact is required for attachment of other structures inside the fuselage to the inwardly facing surfaces 17, then deposition of the foam onto the inward facing surfaces 24 of the frame members 14 can be omitted in a second embodiment. This will save the labor involved in trimming the foam to a uniform thickness to facilitate attachment of the cabin wall panels in the prior embodiment. However, this break in the continuous foam coverage creates a pathway for the migration of water to the inside of the exterior skin.

Figure 4:
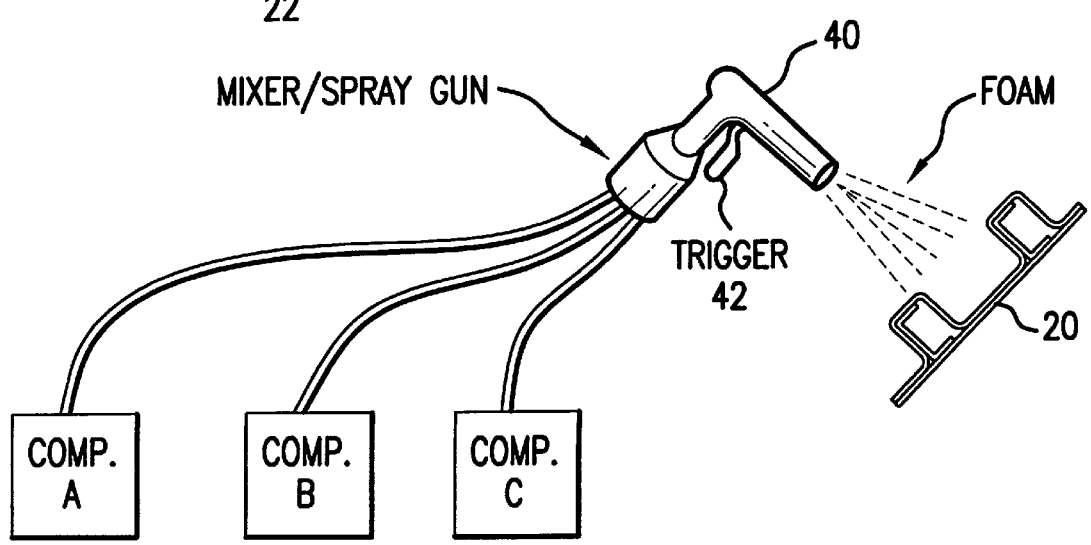
FIG. 4 is a schematic diagram of the system for combining the foam precursor materials and subsequently applying them to the aircraft to form the insulation layer.

FIG. 4 is a schematic view of the various components of the mixing and spraying system used to apply the foam 30 to the barrier material. This system is shown schematically and includes a spray gun 40 having a trigger 42 for control of the amount of foam applied to the draped fuselage structure 20. The foam is normally formed from at least two components, three are shown here, A, B and C. A could be the catalyst for component B, with C being a blowing agent such as carbon dioxide gas.

The particular foam system can be chosen from a number of commercially available foams. As discussed above, the preferred foam is flexible enough to be easily removed if inspections or repairs are necessary and easily re-installed afterwards, the preferred flexibility ranging from stiff to pliable. Since weight is a paramount concern, the density of the foam should be low, ranging between about 0.5 and 5.0 pounds/cubic foot. The preferred foam is preferably hydrophobic, fire-resistant, low thermal and acoustic conductivity and closed cell. Preferably, the foam will form a surface skin upon setting-up which is impermeable to liquid water. Suitable foams include, but are not limited to, two-part polyurethane foam, polyisocynurate foam and silicone foam.

As was discussed above, it is much preferred to create a skin on the outside surface of the foam, facing the interior of the fuselage. The simplest technique to accomplish this is to employ a foam that is self-skinning, that is, a foam that forms a layer at its surface that is stronger and less permeable to liquid water than the foam that is not exposed to the air at the outside surface. In the event the foam is not self-skinning or the skin that is formed is inadequate to the task, a separate outside protective layer can be utilized. In a preferred embodiment, another material can be sprayed onto the outside surface of the foam to form the protective layer. Preferred materials for this use include, but are not limited to, polyurethanes and acrylics. This outer protective layer 34 is desirably resistant to the ingress of liquids but permeable to the passage of gas phase materials, resistant to impact with a preferred thickness of 1 to 20 mils, and flame resistant so as to increase the insulation system's flame resistance. When properly employed, this outer protective layer 34 can act as a substitute for the interior cabin wall panels in certain areas of the fuselage.

The present invention thus provides a low cost, effective insulation system for the fuselage of an aircraft. The resulting foam is lightweight, efficient as both a thermal and sound insulating layer, will not absorb water, is easily fabricated, does not require any custom molds or inventory of different sizes of prefabricated insulation blankets, and is easily removed for inspections of and repairs to the fuselage structure.

Although various embodiments of the present invention have been described in detail hereinabove, it should be clearly understood that many variations and/or modifications of the basic inventive concepts herein taught which may become apparent to those skilled in the pertinent art will still fall within the spirit and scope of the present invention as defined in the appended claims.

What is claimed is:

1. A method for forming a removable insulating layer in the fuselage of an aircraft having an exterior skin for providing insulation between the aircraft cabin and an inner surface of the exterior skin of the aircraft while being removable to allow visual inspection of the inner surface of the fuselage as required, the method comprising the steps of:

draping a removable barrier material against the inner surface of the exterior skin and over any structural members attached thereto such that no substantial portion of the barrier material is trapped against removal by the structural members, and such that an inner surface of the barrier material is in contact with the inner surface of the exterior skin; and applying a foam mixture to an outer surface of the barrier material, which foam mixture subsequently solidifies into the insulating layer.

2. The method of claim 1, wherein the barrier material is attached to the inner surface of the exterior skin of the aircraft before the foam mixture is applied.

3. The method of claim 1, wherein the foam is a closed cell foam.

4. The method of claim 1, wherein the foam forms a water-resistant skin upon curing.

5. The method of claim 1, wherein the foam mixture is applied in a continuous coat to cover the barrier material in the areas comprising substantially the entire inner surface of the exterior skin, the inward facing portions of the structural members, and intermediate regions of the barrier material.

6. The method of claim 1, wherein the insulating layer is selected from the group consisting of polyurethane foam, polyisocyanurate foam, and silicon foam.

7. The method of claim 1 including an additional step of providing a separate protective layer over an outer surface of the foam mixture that is exposed to the interior of the aircraft.

8. The method of claim 7 wherein the protective layer is formed by spraying on the protective layer over the outer surface of the foam mixture that is exposed to the interior of the aircraft.

9. The method of claim 8 wherein the protective layer is selected from the group consisting of polyurethanes and acrylics.

10. A method for providing a removable insulation system in the fuselage of an aircraft having an exterior skin, the insulation system covering the inner surface of the exterior skin of the aircraft to insulate the aircraft cabin from the fuselage while being removable to allow visual inspection of the inner surface of the exterior skin, the method comprising the steps of:

draping a barrier material against the inner surface of the exterior skin and over any structural members attached thereto such that substantially all of the inner surface is covered by the barrier material, and such that an inner surface of the barrier material is in contact with the inner surface of the exterior skin;

applying a foam mixture to an outer surface of the barrier material, which foam mixture subsequently solidifies into an insulating layer; and providing a protective layer over a surface of the foam mixture exposed to the interior of the aircraft.

11. The method of claim 10, wherein the barrier material is attached to the inner surface of the exterior skin while the foam mixture is applied.

12. The method of claim 10, wherein the foam mixture is a closed cell foam.

13. The method of claim 10, wherein the foam mixture forms a water-resistant skin upon curing.

14. The method of claim 10, wherein the foam mixture is applied in a continuous coat to cover the barrier material in the areas comprising the inner surface of the exterior skin, the inward facing portions of the structural members, and intermediate regions of the barrier material.

15. The method of claim 10, wherein the insulating layer is selected from the group consisting of polyurethane foam, polyisocyanurate foam, and silicon foam.

16. The method of claim 10, including the step of spraying on the protective layer over the surface of the foam mixture.

17. The method of claim 16 wherein the protective layer is selected from the group consisting of polyurethanes and acrylics.

* * * * *